Aug. 18, 1959     K. B. TUTTLE ET AL     2,900,136
POLYNOMINAL SOLVER

Filed March 23, 1953     2 Sheets-Sheet 1

INVENTORS:
Lee C. Keene
Kenneth B. Tuttle

By Herbert E. Metcalf
Their Patent Attorney

Aug. 18, 1959　　　K. B. TUTTLE ET AL　　　2,900,136
POLYNOMINAL SOLVER

Filed March 23, 1953　　　2 Sheets-Sheet 2

INVENTORS:
Lee C. Keene
Kenneth B. Tuttle

By Herbert E. Metcalf
Their Patent Attorney

United States Patent Office

2,900,136
Patented Aug. 18, 1959

2,900,136

POLYNOMIAL SOLVER

Kenneth B. Tuttle, Playa Del Rey, and Lee C. Keene, Palos Verdes Estates, Calif., assignors to Northrop Corporation, Hawthorne, Calif., a corporation of California Application March 23, 1953, Serial No. 344,028

12 Claims. (Cl. 235—180)

This invention relates to electronic analog computers and, more particularly, to means for obtaining numerical solutions to algebraic equations with complex roots.

An "integral rational function of $x$" or a "polynomial in $x$" refers to a mathematical expression of the form:

$$a_0x^n + a_1x^{n-1} + a_2x^{n-2} + \ldots + a_{n-1}x + a_n = 0$$

where "$a$'s" are constant coefficients (including zero), "$x$" is a variable and "$n$" is an integral number.

It is a fundamental theorem of algebra that every algebraic equation with arbitrarily given complex coefficients has always at least one real or imaginary root. The number of roots of a polynomial is equal to the degree of this polynomial; such roots can be generally expressed as complex quantities of the form $A+Bj$, where A and B are real coefficients (including zero) and $j$ is defined as being equal to $\sqrt{-1}$. The method of solution of a specific algebraic equation, i.e. an algebraic equation with numerical coefficients "$a$" and of degree "$n$" consists of determining the values of A and B such that substitution of $x=A+Bj$ into each term of the equation will meet its requirement e.g. have a net value of zero.

The electronic analog computer herein disclosed comprises a multiplicity of voltage control stages, each of which operates on its input signal in such a manner that an "in-phase" voltage is developed and also a quadrature voltage is developed. The "in-phase" voltage is proportional to a coefficient A; the quadrature voltage is proportional to a coefficient B. These voltages are summed vectorially, thus producing a quantity $A+Bj$ where $j$ denotes a 90° phase shift with respect to the input voltage. As a result, the output voltage of the first voltage control stage is proportional to a complex expression $A+Bj$; similarly, the output voltages of succeeding voltage control stages are proportional to $(A+Bj)^2$, $(A+Bj)^3$, $(A+Bj)^4$, etc. It is to be noted that since $x=A+Bj$, output voltages of respective voltage control stages are proportional to $x$, $x^2$, $x^3$, $x^4$, etc. Means are provided for applying constant multipliers to the respective input voltages; consequently voltages proportional to $a_{n-1}x$, $a_{n-2}x^2$, $a_{n-3}x^3$, $a_{n-4}x^4$, etc. are developed. Eventual summation of these voltages and a constant voltage results in the development of a voltage proportional to $a_n + a_{n-1}x + a_{n-2}x^2 + a_{n-3}x^3 + \ldots + a_1x^{n-1} + a_0x^n$. The voltages that are proportional to A and B in each respective voltage control stage are then varied in order to obtain values of coefficients A and B which cause the voltage proportional to the expression $$a_n + a_{n-1}x + a_{n-2}x^2 + \ldots + a_1x^{n-1} + a_0x^n$$

to be effectively reduced to zero. Magnitudes of voltages proportional to coefficients A and B are the constant coefficients in the expression $A+Bj$ that determine the roots of the algebraic equation concerned.

It is accordingly, a principal object of this invention to provide means for the rapid determination of roots of a given algebraic equation.

It is a further object of this invention to provide means for the rapid determination of constant coefficients of a complex quantity.

Other objects of the invention will become apparent from a consideration of the ensuing description and the accompanying drawings in which:

Figure 1 is a combination block-schematic diagram of a preferred embodiment of the invention.

Figures 2 through 2e comprise a series of vector diagrams of typical voltages existing at several points in the circuit of Figure 1.

Referring to Figure 1, note that a preferred embodiment of the invention includes sinusoidal voltage source 1 which supplies a sinusoidal voltage of known amplitude at its output 2 to a first voltage control stage I of the analog circuit. This sinusoidal voltage is applied to control potentiometer 4 at point 3 and to phase shift condenser 7 and imaginary voltage control potentiometer 8 at point 6. Control potentiometer 4 regulates a real voltage component of its input voltage.

A resulting voltage at sliding contact 5 of voltage control potentiometer 4 and a resulting voltage at sliding contact 9 of voltage control potentiometer 8 are applied to inputs 13 and 15 of feedback amplifier summing device 14. Feedback amplifier summing devices are well known to the electronic art; for example, a suitable feedback amplifier summing device is shown and described on page 148 of "Electron Tube Circuits" (1950 edition) by Seely. The vector sum of these two voltages is applied to second voltage control stage II from output 16.

Voltage control stage II is identical with voltage control stage I except a different means is employed to effect a 90° phase shift in developing an imaginary voltage component. The condenser 7-potentiometer 8 combination has the voltage-frequency characteristics of a differentiating circuit which tends to accentuate high frequency voltages and suppress low frequency voltages. However, a variable resistor 21, condenser 22, and electron tube 24 combination as shown has a voltage-frequency characteristic of an integrator circuit, which tends to accentuate low frequency voltages and substantially suppress the high frequency voltages. By alternately utilizing one phase shift means and then the other in successive voltage control stages, the stray high and low frequency voltages, beyond the pure sinusoidal input voltage, will be effectively positioned within desired limits and will not affect the accuracy of succeeding stages.

Sliding contacts 5, 19, 37, and 51 are so disposed that they maintain an identical relationship with their respective voltage potentiometers 4, 18, 36, and 50 (for control of real voltage components) and are simultaneously controlled by movement of voltage control knob 78. The voltage potentiometer sliding contacts 9, 26, 41, and 59 are so disposed that they maintain an identical relationship with their respective voltage potentiometers 8, 27, 40, and 58 (for control of imaginary voltage components) and are simultaneously controlled by movement of voltage control knob 77.

Output voltages from the various voltage control stages and the sinusoidal voltage input at sliding contacts 12, 34, 48, 66, and 69 of coefficient control potentiometers 11, 33, 47, 65 and 68 are applied to a feedback amplifier summing device 70 via input 71. The vector sum of these voltages appears at the output 72 of feedback amplifier summing device 70 and a voltmeter 73 connected thereto detects the presence or absence of a voltage between output 72 and ground connection 74.

Initially, variable condensers 7 and 39 and the variable resistors 21 and 53 are adjusted until the amplitude of the voltages at outputs 2, 16, 30, 45, and 62 are all equal when control potentiometers 4, 8, 18, 27, 36, 40, 50, and 58 are set so that the voltage at their respective sliding contacts 5, 9, 19, 26, 37, 41, 51, and 59 is maximum in amplitude.

For example, assume that the algebraic equation to be solved is known, hence the constant coefficients $a_0$, $a_1$, $a_2$, etc. are numerically known. These constant coefficients may be real, imaginary, or complex constants —functions of a mutual known constant parameter or combinations thereof. If the equation contains both real and imaginary constant coefficients, the terms are regrouped into two equations, one with real coefficients and the other with pure imaginary coefficients; then the two equations are solved independently in order to obtain all of the roots of the original equation.

The voltages proportional to the coefficients are developed by voltage division in potentiometers, therefore, the largest numerical value for a coefficient in the equation being solved is unity. If coefficients larger than unity appear in the original equation it may be transformed, by a change of variables, to an equation suitable for application to the present invention, i.e., the variable "$x$" and powers thereof appearing in the original equation are replaced with $$\frac{"x"}{b}$$

and corresponding powers thereof, where "$b$" is a constant of sufficient value that the substitution of variables results in an equation with the coefficients of all terms of the equation having a value of unity or less.

The constant coefficients of the terms in the equation to be solved are applied to the computer by adjusting sliding contacts 12, 34, 48, 66 and 69 of the coefficient control potentiometers 11, 33, 47, 65, and 68, respectively; the final position of the sliding contacts 12, 34, 48, 66, and 69 being determined by the rotation of indexed control knobs (or levers) wtih respect to fixed calibrated scales (not shown). Each sliding contact is respectively coupled to an indexed control knob (or lever) which indicates against a fixed calibrated scale in the same manner that knobs 77 and 78 indicate with respect to fixed calibrated scales 79 and 80, for example.

Coefficient control potentiometer 11 applies the coefficient $a_n$ to the reference sinusoidal voltage at point 10, i.e. it applies the coefficient $a_n$ to the zero power of the variable $x$. The voltage at sliding contact 12, therefore, is proportional to the $n$th term, $a_n$, of the equation being solved.

The reference sinusoidal voltage at point 6 is shifted 90° in phase by action of condenser 7; consequently the mathematical quantity $j$ is simulated; this voltage is thereafter altered in amplitude by the control potentiometer 8 in order to develop a voltage proportional to the imaginary quantity $Bj$, hereafter referred to as the imaginary voltage.

The reference sinusoidal voltage at point 3 is applied to control potentiometer 4; as a result, voltage amplitude is altered thereby developing a voltage proportional to the real quantity $A$, hereafter referred to as the real voltage. This voltage appears at sliding contact 5.

The real and imaginary voltage components of voltage control stage I are then vectorially summed in feedback amplifier summing device 14, to produce a voltage at its output 16 that is proportional to $A+Bj$; since $A+Bj$ equals the unknown $x$, the output voltage at 16 is proportional to the first power of the unknown $x$. The sliding contact 34 of coefficient control potentiometer 33 is adjusted to be proportional to the numerical value $a_{n-1}$ of the coefficient of the first power of the unknown $x$; therefore, the output voltage at sliding contact 34 is proportional to $a_{n-1}x$.

Voltage from output 16, that is proportional to $A+Bj$, is applied to voltage control potentiometer 18 of voltage control stage II, to alter its amplitude by a factor $A$, thereby developing a voltage at sliding contact 19 that is proportional to $A^2+ABj$. Voltage from output 16 is phase-inverted by the tube 24, shifted in phase 90° by action of condenser 22 and altered in amplitude by voltage control potentiometer 27 to produce an output at sliding contact 26 proportional to $ABj+(Bj)^2$. The voltages proportional to $A^2+ABj$ and $ABj+(Bj)^2$ are vectorially summed in feedback amplifier summing device 31 to produce a voltage proportional to $$A^2-B^2+2ABj=X^2$$

Coefficient control potentiometer 47 applies the coefficient $a_{n-2}$ to produce a voltage at its output 48 that is proportional to $a_{n-2}x^2$.

By a similar operation the voltages developed at sliding contacts 66 and 69 will be proportional to $a_{n-3}x^3$ and $a_{n-4}x^4$, respectively.

The voltages proportional to $a_n$, $a_{n-1}x$, $a_{n-2}x^2$, $a_{n-3}x^3$, and $a_{n-4}x^4$ are then vectorially summed in the feedback amplifier summing device 70, whose output voltage is detected by voltmeter 73.

Reference is now made to Figure 2 which comprises a series of vector diagrams illustrative of how the invention generates voltages proportional to solutions of algebraic equations. Figure 2 illustrates the well-known mathematical theory in which an operator "$j$" is used to produce 90° counter-clockwise rotation of any vector to which it is applied as a multiplying factor. Figure 2 illustrates effects produced by successive applications of the operator "$j$" upon a vector $A$, the original position of which is along the $x$-axis. By definition, when vector $A$ is multiplied by "$j$" a new vector, $jA$, 90° counterclockwise from vector $A$, will be obtained. If the operator $j$ is applied to vector $jA$ it will, by definition, rotate $jA$ 90° in the counter-clockwise direction. The result is $jjA$ or $j^2A$.

$$j^2A=-A$$
$$j^2=-1$$
$$j=\sqrt{-1}$$

Note further that if the operator "$j$" is applied to the vector $j^2A$ the result is $j^3A=-jAj$ the vector $j^3A$ is 270° counter-clockwise from the reference axis, directly opposite the vector $jA$. Similarly, operation on vector $j^3A$ by "$j$" yields $j^4A=j^2j^2A=A$; thus successive applications of the operator "$j$" to the vector $A$ are observed to produce successive 90° steps of rotation of the vector in the counter-clockwise direction without affecting the magnitude of the vector. The 90° phase shift in voltage utilized in the invention herein disclosed is analogous to the operator "$j$".

Reference sinusoidal voltage $V$ is represented by vector $V$ in the graph comprising Figure 2a. A voltage proportional to the constant term $a_n$ is represented by vector $V_1$.

Figure 2c also illustrates how voltage vector $V_3^2$ which is proportional to the quantity $a_{n-2}x^2$ is developed from the vector sum of $V_3$ and $jV_3$.

Figure 1:
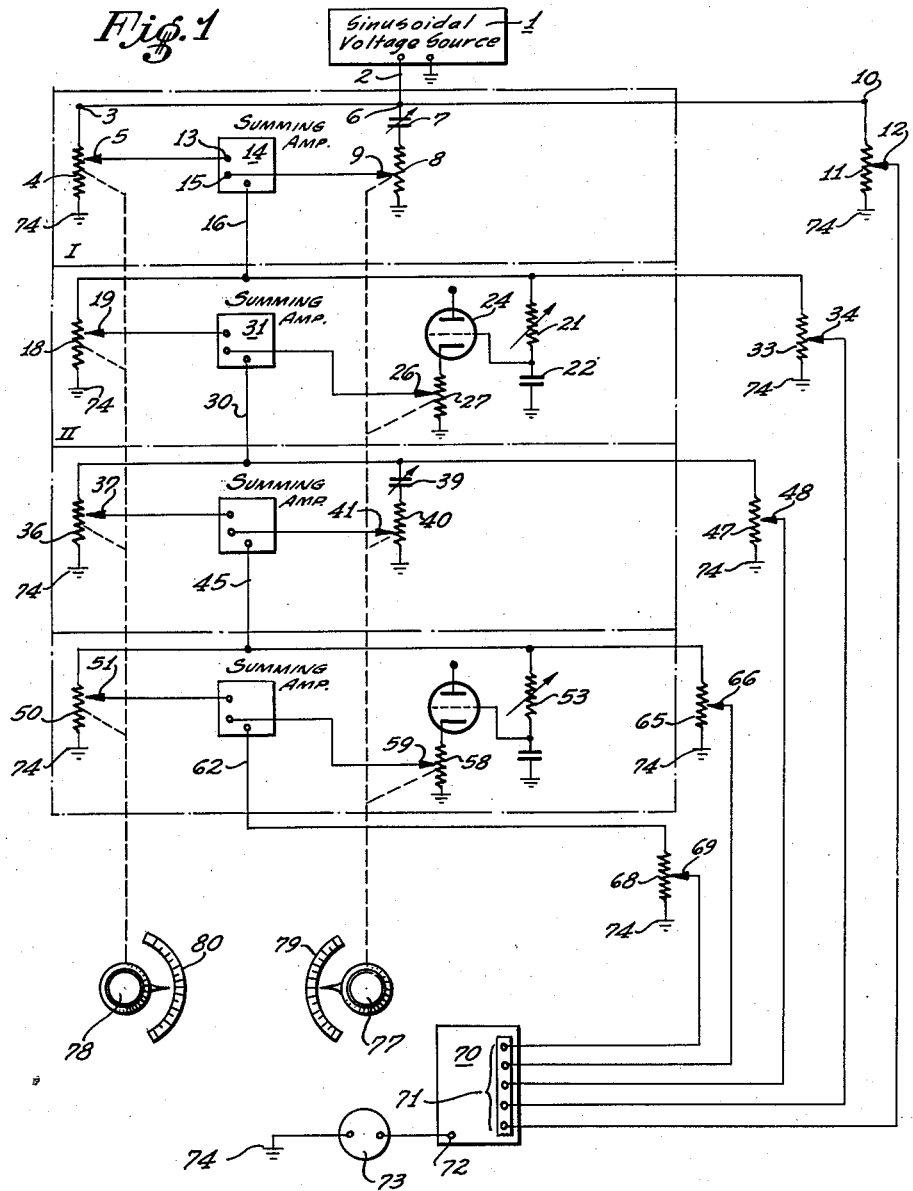
Figure 2:
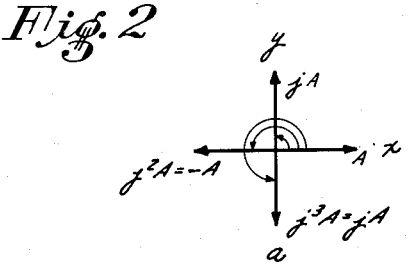
Figure 2b illustrates the effect of a 90° phase shift voltage $jV$ combining with $V$ to effect a voltage $V_2$ which is the vector sum of $V$ and $jV$; similarly, voltage vector $V_3$ represents the vector sum of $V_1$ and $jV_1$; voltage vector $V_3$ is proportional to $a_{n-1}x$.
Figure 2c illustrates how $V_2^2$ is developed from the vector sum of $V_2$ and $jV_2$ which is 90° out of phase with $V_2$.
Figures 2d and 2e illustrate how voltage vectors $V_2^3$ and $V_3^3$ are developed and how voltage vectors $V_2^4$ and $V_3^4$ are developed; voltage vector $V_3^3$ is proportional to the quantity $a_{n-3}x^3$ voltage vector $V_3^4$ is proportional to the quantity $a_{n-3}x^4$.
Figure 2A:
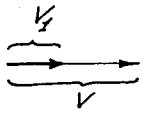
Figure 2B:
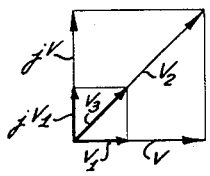
Figure 2C:
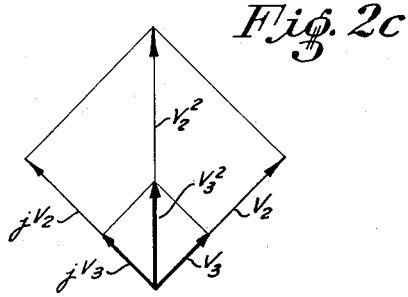
Figure 2D:
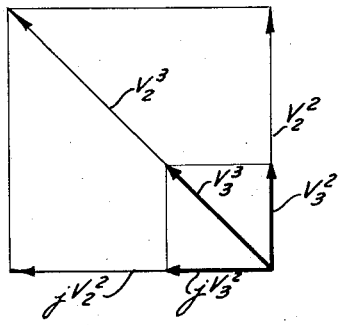
Figure 2E:
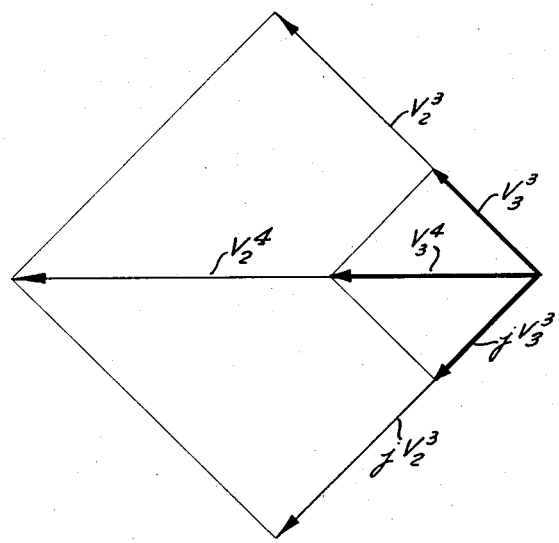

It is to be noted that a polynomial of the form $a_0x^n+a_1x^{n-1}+a_2x^{n-2}+ \ldots +a_{n-1}x+a_n$ is equal 0 when quantities $A$ and $B$ are properly selected; furthermore the expression $A+Bj$ is a root of the polynomial and the sum of the resulting vectors, developed as shown in Figure 2, will form a closed polygon.

Thus there has been described a polynomial solver of simple, efficient design. Many variations in the arrangement of the system or in the network described, without departing from the spirit and scope of the invention, may be apparent to those skilled in the art. Therefore the invention is claimed in any of its forms or modifications within the legitimate and valid scope of the appended claims.

What is claimed is:

1. An electronic computer for solving polynomials comprising: means adapted to receive a sinusoidal voltage; a plurality of voltage control stages of first and second types having inputs and outputs, and different types alternately serially connected to said means for receiving said sinusoidal voltage; said first type voltage control stage comprising: a first control potentiometer, connected to vary the amplitude of a voltage received at the input of said first type stage; a differentiating phase-shift circuit connected to shift the phase and vary the amplitude of a voltage received at the input of said first type stage; and a first feedback amplifier connected to receive and vectorially summarize a voltage from said first control potentiometer and a voltage from said differentiating phase-shift circuit to form an output from said first type voltage control stage; said second type voltage control stage comprising: a second control potentiometer connected to vary the amplitude of a voltage received at the input of said second type stage; an integrating phase-shift circuit connected to shift the phase and vary the amplitude of a voltage received at the input of second type stage; and a second feedback amplifier connected to receive and vectorially summarize a voltage from said second control potentiometer and a voltage from said integrating phase-shift circuit to form an output from said second type voltage control stage; said computer further comprising: a final feedback amplifier; and means for applying a portion of each of the voltages appearing at the inputs to said voltage control stages to said final feedback amplifier whereby said portions will be vectorially summarized.

2. Apparatus according to claim 1 wherein said means for applying a portion of each of said voltages appearing at the inputs to said voltage control stages comprise independently controlled potentiometers.

3. A polynomial solver comprising: a plurality of voltage control stages of first and second types each having an input and an output, and being alternately connected in a first serial circuit; means connected to apply a sinusoidal voltage to a first voltage control stage in said first serial circuit; said first type voltage control stage comprising: a first real component control potentiometer and a second serial circuit including a variable condenser and a first imaginary voltage component control potentiometer, said first real component control potentiometer and said second serial circuit being connected to be energized by the input to said first type voltage control stage; and a first feedback amplifier connected to receive and vectorially summarize voltages from said first real component control potentiometer and said first imaginary voltage component control potentiometer to thereby provide an output from said first type voltage control stage; said second type voltage control stage comprising: a second real voltage component control potentiometer; an electron tube including at least a plate, a grid and a cathode; and a third serial circuit including a variable resistor and a fixed condenser; said second real voltage component control potentiometer and said third serial circuit being connected to be energized by the input to said second type voltage control stage, a second imaginary voltage component control potentiometer connected to the cathode of said electron tube; means connected to said tube to provide an electrical current through said tube controlled by the voltage developed across said fixed condenser; a second feedback amplifier connected to receive and vectorially summarize voltages from said second real component control potentiometer and said second imaginary voltage component control potentiometer to thereby provide an output from said second type voltage control stage; said polynomial solver further comprising a final feedback amplifier; and means for applying a portion of each of the voltages appearing at the inputs of said voltage control stages to said final feedback amplifier to thereby be vectorially summarized.

4. Apparatus according to claim 3 wherein said means for applying a portion of each of the voltages appearing at the input of said voltage control stages to said final feedback amplifier comprise a plurality of independently controlled potentiometers.

5. Apparatus in accordance with claim 1 including an indicating means connected to the output means of said final feedback amplifier summing device for determining the output condition thereof.

6. Apparatus in accordance with claim 5 in which said indicating means is a voltmeter.

7. Apparatus in accordance with claim 3 including means for simultaneous variation of said first and said second real voltage component control potentiometers and means for simultaneous variation of said first and said second imaginary voltage component control potentiometers of said voltage control stages.

8. Apparatus in accordance with claim 3 including indicating means connected to the output means of said final feedback amplifier summing device for determining the output condition thereof.

9. Apparatus in accordance with claim 8 in which said indicating means is a voltmeter.

10. In the polynomial solver, a voltage control stage, comprising: input means for connecting an input voltage thereto; means for developing an in-phase voltage component proportional to a coefficient A connected to said input means; means for developing a quadrature voltage component proportional to a coefficient B connected to said input means; and means for vectorially summing said in-phase voltage component and said quadrature voltage component for an output voltage proportional to a complex expression $A+Bj$.

11. Apparatus in accordance with claim 10 wherein said means for developing a quadrature voltage component includes a differentiating circuit.

12. Apparatus in accordance with claim 10 wherein said means for developing a quadrature voltage component includes an integrating circuit.

References Cited in the file of this patent

UNITED STATES PATENTS 2,558,430   Goldberg _____ June 26, 1951

OTHER REFERENCES

Russel and Wright: XXXVI, The Arthur Wright Electrical Device for Evaluating Formulae and Solving Equations; The London, Edinburg and Dublin Philosophical Magazine, volume XVIII, Sixth Series, 1909, pp. 291–308.

A Circuit for Generating Polynomials and Find Their Zeroes (Bubb), Proceedings of the I.R.E., vol. 39, No. 12, December 1951, pp. 1556–1561.

Isolating Circuits for Analog Computers (McCoy and Bradley), Electronics, October 1952, pp. 162–164.